United States Patent
Miller et al.

(10) Patent No.: US 7,849,682 B2
(45) Date of Patent: Dec. 14, 2010

(54) EXHAUST TREATMENT DEVICE HAVING A FUEL POWERED BURNER

(75) Inventors: Robert L. Miller, Dunlap, IL (US); Thomas Randall McClure, Washington, IL (US); Kevin James Karkkainen, Washington, IL (US)

(73) Assignee: Caterpillar Inc, Peoria, IL (US)

( * ) Notice: Subject to any disclaimer, the term of this patent is extended or adjusted under 35 U.S.C. 154(b) by 978 days.

(21) Appl. No.: 11/594,884

(22) Filed: Nov. 9, 2006

(65) Prior Publication Data

US 2008/0078172 A1    Apr. 3, 2008

Related U.S. Application Data (60) Provisional application No. 60/841,219, filed on Aug. 31, 2006.

(51) Int. Cl.
| F01N 3/10 | (2006.01) |
| F01N 3/00 | (2006.01) |
| F23C 5/00 | (2006.01) |
| F23M 3/04 | (2006.01) |
| F23C 5/08 | (2006.01) |
| F23M 9/00 | (2006.01) |
| F23Q 3/00 | (2006.01) |

(52) U.S. Cl. .............. 60/303; 60/286; 60/289; 60/298; 60/300; 431/8; 431/10; 431/181; 431/183; 431/265; 431/264

(58) Field of Classification Search .......... 60/286, 60/289, 303, 298, 300; 431/8, 10, 181, 183, 431/265, 264

See application file for complete search history.

(56) References Cited

U.S. PATENT DOCUMENTS

| 3,383,854 A | 5/1968 | White |
| 3,742,682 A | 7/1973 | Ligutom |
| 3,957,467 A | 5/1976 | Kim |
| 4,300,924 A | 11/1981 | Coyle |
| H172 H | 12/1986 | Pribyl et al. |
| 4,651,524 A | 3/1987 | Brighton |
| 4,719,751 A | 1/1988 | Kume et al. |

(Continued)

FOREIGN PATENT DOCUMENTS

EP    1 336 729    8/2003

OTHER PUBLICATIONS

Powell, Fekete, Chang, Observer Based Air Fuel Ratio Control, 1998, IEEE Control Systems, p. 1-12.*

(Continued)

*Primary Examiner*—Thomas E Denion
*Assistant Examiner*—Michael Carton
(74) *Attorney, Agent, or Firm*—Finnegan, Henderson, Farabow, Garrett & Dunner LLC (57) ABSTRACT

An aftertreatment burner for an exhaust treatment device is disclosed. The aftertreatment burner may have a mounting member, and a canister connected to the mounting member to form a combustion chamber. The aftertreatment burner may also have a fuel injector disposed within the mounting member to selectively inject fuel into combustion chamber, and an air supply line configured to supply air to the combustion chamber. The aftertreatment burner may further have an igniter disposed within the mounting member to ignite the fuel/air mixture, and a thermal couple configured to detect the ignition.

20 Claims, 4 Drawing Sheets

U.S. PATENT DOCUMENTS

| | | | |
|---|---|---|---|
| 4,944,153 A * | 7/1990 | Goerlich et al. ............... | 60/303 |
| 4,987,738 A | 1/1991 | Lopez-Crevillen et al. | |
| 5,095,694 A | 3/1992 | Shekleton et al. | |
| 5,243,816 A | 9/1993 | Huddas | |
| 5,353,591 A * | 10/1994 | Kabasin et al. ............... | 60/274 |
| 5,709,080 A * | 1/1998 | Arora et al. ................... | 60/274 |
| 6,032,462 A | 3/2000 | Chu | |
| 6,045,054 A * | 4/2000 | Peterson, Jr. ................... | 239/5 |
| 6,050,081 A | 4/2000 | Jansen et al. | |
| 6,170,467 B1 * | 1/2001 | Girard ........................ | 123/470 |
| 6,438,959 B1 * | 8/2002 | Dean et al. .................... | 60/760 |
| 6,438,963 B1 | 8/2002 | Traver et al. | |
| 6,499,463 B1 * | 12/2002 | Berriman et al. ............ | 123/431 |
| 6,536,217 B2 | 3/2003 | Lipinski et al. | |
| 6,931,831 B2 | 8/2005 | Jansen | |
| 2003/0145823 A1 * | 8/2003 | Wirth ........................ | 123/276 |
| 2004/0020193 A1 | 2/2004 | Miebach | |
| 2005/0034460 A1 * | 2/2005 | McMasters et al. .......... | 60/752 |
| 2005/0150220 A1 * | 7/2005 | Johnson et al. ............... | 60/295 |
| 2006/0191254 A1 * | 8/2006 | Bui et al. ...................... | 60/286 |
| 2006/0218902 A1 | 10/2006 | Arellano et al. | |

OTHER PUBLICATIONS

Harmon et al., U.S. Appl. No. 11/170,318, filed Jun. 30, 2005, entitled "Regeneration Assembly,".
Miller et al., U.S. Appl. No. 11/503,305, filed Aug. 14, 2006, entitled "Fuel Supply Component Purging System,".
Karkkainen et al., U.S. Appl. No. 11/503,306, filed Aug. 14, 2006, entitled "Fuel Supply Component Cleaning System,".
PCT International Search Report, Applicant's Ref. No. 06-655; International Appln. No. PCT/US2007/017092; Filing Date: Jul. 31, 2007, Applicant: Caterpillar Inc.

* cited by examiner

EXHAUST TREATMENT DEVICE HAVING A FUEL POWERED BURNER

RELATED APPLICATIONS

This application is based on and claims the benefit of priority from U.S. Provisional Application No. 60/841,219 by Robert L. MILLER, Thomas R. MCCLURE, and Kevin J. KARKKAINEN, filed Aug. 31, 2006, the contents of which are expressly incorporated herein by reference.

TECHNICAL FIELD

The present disclosure is directed to an exhaust treatment device and, more particularly, to a fuel powered burner for an exhaust treatment device.

BACKGROUND

Internal combustion engines, including diesel engines, gasoline engines, gaseous fuel-powered engines, and other engines known in the art may exhaust a complex mixture of air pollutants. The air pollutants may be composed of gaseous compounds such as nitrogen oxides and carbon monoxide, and solid particulate matter, which may include unburned carbon particles also known as soot.

Due to increased awareness of the environment, exhaust emission standards have become more stringent, and the amount of gaseous compounds and particulate matter emitted from an engine may be regulated depending on the type of engine, size of engine, and/or class of engine. One method that has been implemented by engine manufacturers to comply with the regulation of emissions has been to remove the gaseous compounds and particulate matter from the exhaust flow of an engine using an exhaust treatment device. An exhaust treatment device typically includes a filter medium designed to trap particulate matter, and a catalyst utilized to absorb or convert the nitrogen oxides and/or carbon monoxide to inert fluids.

However, the use of the exhaust treatment device for extended periods of time can cause particulate matter to build up in the filter medium, thereby reducing the functionality of the filter and subsequently engine performance. The collected particulate matter may be removed from the filter through a process called regeneration. To initiate regeneration of the filter, the temperature of the particulate matter entrained within the filter must be elevated above a combustion threshold, at which the particulate matter is burned away. One way to elevate the temperature of the particulate matter is to inject fuel into the exhaust flow of the engine and ignite the injected fuel. The heat resulting from this fuel combustion, in addition to regenerating the filtration medium, may also or alternatively be selectively directed to the catalyst to improve operation of the device.

One way to enhance the efficiency of this heating process is to mix the injected fuel with air prior to and/or during combustion. That is, a homogenous air/fuel mixture, when ignited, may produce an evenly distributed flame that efficiently burns away the particulate matter from the filtration medium and/or heats the catalytic device. To control this mixing and heating process, it may be important to detect ignition of the mixture and/or the temperature of the mixture as the process progresses.

An example of injecting fuel and igniting the injected fuel to regenerate a particulate filter is described in U.S. Pat. No. 4,987,738 (the '738 patent) issued to Lopez-Crevillen et al. on Jan. 29, 1991. Specifically, the '738 patent discloses a canister having a particulate filter disposed therein. A diffuser connects the canister to a mixing chamber, which is in turn connected to a burner. A fuel injector nozzle is mounted within the burner for injecting fuel into the mixing chamber during regeneration. As the fuel, under pressure, is injected by the nozzle into the mixing chamber, high pressure air is also directed through the burner and mixing chamber to atomize the fuel. An igniter also mounted within the burner is then energized to ignite the atomized air-fuel mixture, and the burning mixture is combined with metered exhaust gas and directed through the diffuser to the canister. This heated fuel-air-exhaust mixture is then used to incinerate trapped particulates.

Although the burner configuration of the '738 patent may suitably regenerate a particulate-laden filter, it may be large, and inefficient. Specifically, because the mixing chamber is separate from the burner apparatus and sequentially located with respect to flow through the burner apparatus, it may consume valuable space within an engine compartment or undercarriage of a vehicle. Further, the burner configuration of the '738 patent may provide no way to detect ignition of the fuel-air mixture or temperature of the combustion process. Without a way to confirm ignition, flame extinction, or monitor the combustion process, the process could progress inefficiently or not at all, with no indication of its poor performance being communicated, observed, or accommodated.

The fuel burner of the present disclosure solves one or more of the problems set forth above.

SUMMARY OF THE INVENTION

One aspect of the present disclosure is directed to an aftertreatment burner. The aftertreatment burner may include a mounting member, and a canister connected to the mounting member to form a combustion chamber. The aftertreatment burner may also include a fuel injector disposed within the mounting member to selectively inject fuel into the combustion chamber, and an air supply line disposed within the mounting member and configured to supply air to the combustion chamber. The aftertreatment burner may further include an igniter disposed within the mounting member to ignite the fuel/air mixture, and a thermal couple disposed within the mounting member and configured to detect the ignition.

Another aspect of the present disclosure is directed to another aftertreatment burner. This aftertreatment burner may also include a mounting member, and a canister connected to the mounting member to form a combustion chamber. The aftertreatment burner may further include a fuel injector disposed within the mounting member to selectively inject fuel into the combustion chamber, and an air supply line disposed within the mounting member and configured to supply air to the combustion chamber. The aftertreatment burner may additionally include an igniter disposed within the mounting member to ignite the fuel/air mixture, and a mixer completely disposed within the mounting member to mix the injected fuel and the supplied air.

DETAILED DESCRIPTION

Figure 1:
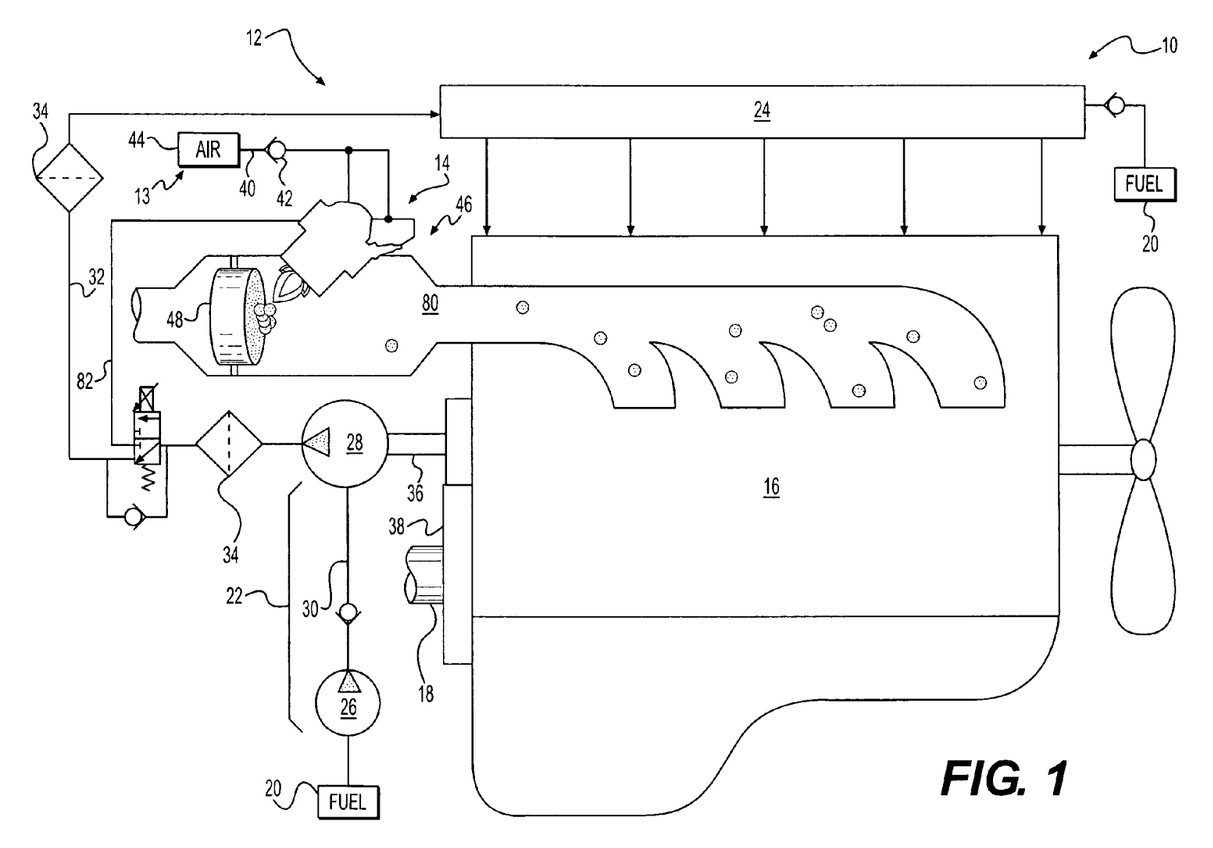
FIG. 1 is a schematic and diagrammatic illustration of an exemplary disclosed power unit.

FIG. 1 illustrates a power unit 10 having a common rail fuel system 12, a purge system 13, and an auxiliary regeneration system 14. For the purposes of this disclosure, power unit 10 is depicted and described as a four-stroke diesel engine. One skilled in the art will recognize, however, that power unit 10 may be any other type of internal combustion engine such as, for example, a gasoline or a gaseous fuel-powered engine. Power unit 10 may include an engine block 16 that at least partially defines a plurality of combustion chambers (not shown). In the illustrated embodiment, power unit 10 includes four combustion chambers. However, it is contemplated that power unit 10 may include a greater or lesser number of combustion chambers and that the combustion chambers may be disposed in an "in-line" configuration, a "V" configuration, or any other suitable configuration.

As also shown in FIG. 1, power unit 10 may include a crankshaft 18 that is rotatably disposed within engine block 16. A connecting rod (not shown) may connect a plurality of pistons (not shown) to crankshaft 18 so that a sliding motion of each piston within the respective combustion chamber results in a rotation of crankshaft 18. Similarly, a rotation of crankshaft 18 may result in a sliding motion of the pistons.

Common rail fuel system 12 may include components that cooperate to deliver injections of pressurized fuel into each of the combustion chambers. Specifically, common rail fuel system 12 may include a tank 20 configured to hold a supply of fuel, and a fuel pumping arrangement 22 configured to pressurize the fuel and direct the pressurized fuel to a plurality of fuel injectors (not shown) by way of a common rail 24.

Fuel pumping arrangement 22 may include one or more pumping devices that function to increase the pressure of the fuel and direct one or more pressurized streams of fuel to common rail 24. In one example, fuel pumping arrangement 22 includes a low pressure source 26 and a high pressure source 28 disposed in series and fluidly connected by way of a fuel line 30. Low pressure source 26 may embody a transfer pump that provides low pressure feed to high pressure source 28. High pressure source 28 may receive the low pressure feed and increase the pressure of the fuel to the range of about 30-300 MPa. High pressure source 28 may be connected to common rail 24 by way of a fuel line 32. One or more filtering elements 34, such as a primary filter and a secondary filter, may be disposed within fuel line 32 in series relation to remove debris and/or water from the fuel pressurized by fuel pumping arrangement 22.

One or both of low and high pressure sources 26, 28 may be operably connected to power unit 10 and driven by crankshaft 18. Low and/or high pressure sources 26, 28 may be connected with crankshaft 18 in any manner readily apparent to one skilled in the art where a rotation of crankshaft 18 will result in a corresponding driving rotation of a pump shaft. For example, a pump driveshaft 36 of high pressure source 28 is shown in FIG. 1 as being connected to crankshaft 18 through a gear train 38. It is contemplated, however, that one or both of low and high pressure sources 26, 28 may alternatively be driven electrically, hydraulically, pneumatically, or in any other appropriate manner. It is further contemplated that common rail fuel system 12 may alternatively embody another type of fuel system such as, for example, mechanical unit fuel injector systems where the pressure of the injected fuel is generated or enhanced within the individual injectors without the use of a high pressure source.

Purge system 13 may pressurize a fluid and provide this pressurized fluid to auxiliary regeneration system 14 for purging and/or combustion purposes. For example, a fluid such as compressed air or natural gas may be directed to auxiliary regeneration system 14 to purge components thereof of residual fuel and/or contaminates. Alternatively or additionally, this purge fluid may be directed to mix with injections of fuel from common rail 24 and, thereby, aid combustion within auxiliary regeneration system 14. For these purposes, purge system 13 may include a fluid source 44 such as, for example, a compressor, an air pump, or any other suitable source, and a storage reservoir, such as a tank or an accumulator having sufficient volume to complete a purging and/or combusting process with or without operation of fluid source 44. A purge passageway 40 may fluidly connect the components of auxiliary regeneration system 14 to fluid source 44 at any upstream location. A check valve 42 may be disposed within purge passageway 40 to ensure that fuel and other contaminates are blocked from flowing through purge passageway 40 to fluid source 44. The flow of purge fluid through purge passageway 40 may be controlled by way of a suitable valve arrangement (not shown).

It is contemplated that a separate combustion air source (not shown) may be provided, if desired. Specifically, in some situations, the purge fluid may include something other than air such as, for example, water, a cleaning solution, or a combination of these fluids. In these situations, the separate source may provide the air required for combustion within auxiliary regeneration system 14.

Auxiliary regeneration system 14 may be associated with an exhaust treatment device 46. In particular, as exhaust from power unit 10 flows through exhaust treatment device 46, particulate matter may be removed from the exhaust flow by catalyzed wire mesh or ceramic honeycomb filtration media 48. Over time, the particulate matter may build up in filtration media 48 and, if left unchecked, the particulate matter buildup could be significant enough to restrict, or even block the flow of exhaust through exhaust treatment device 46, allowing for backpressure within the power unit 10 to increase. An increase in the backpressure of power unit 10 could reduce the power unit's ability to draw in fresh air, resulting in decreased performance, increased exhaust temperatures, and poor fuel consumption.

Figure 2:
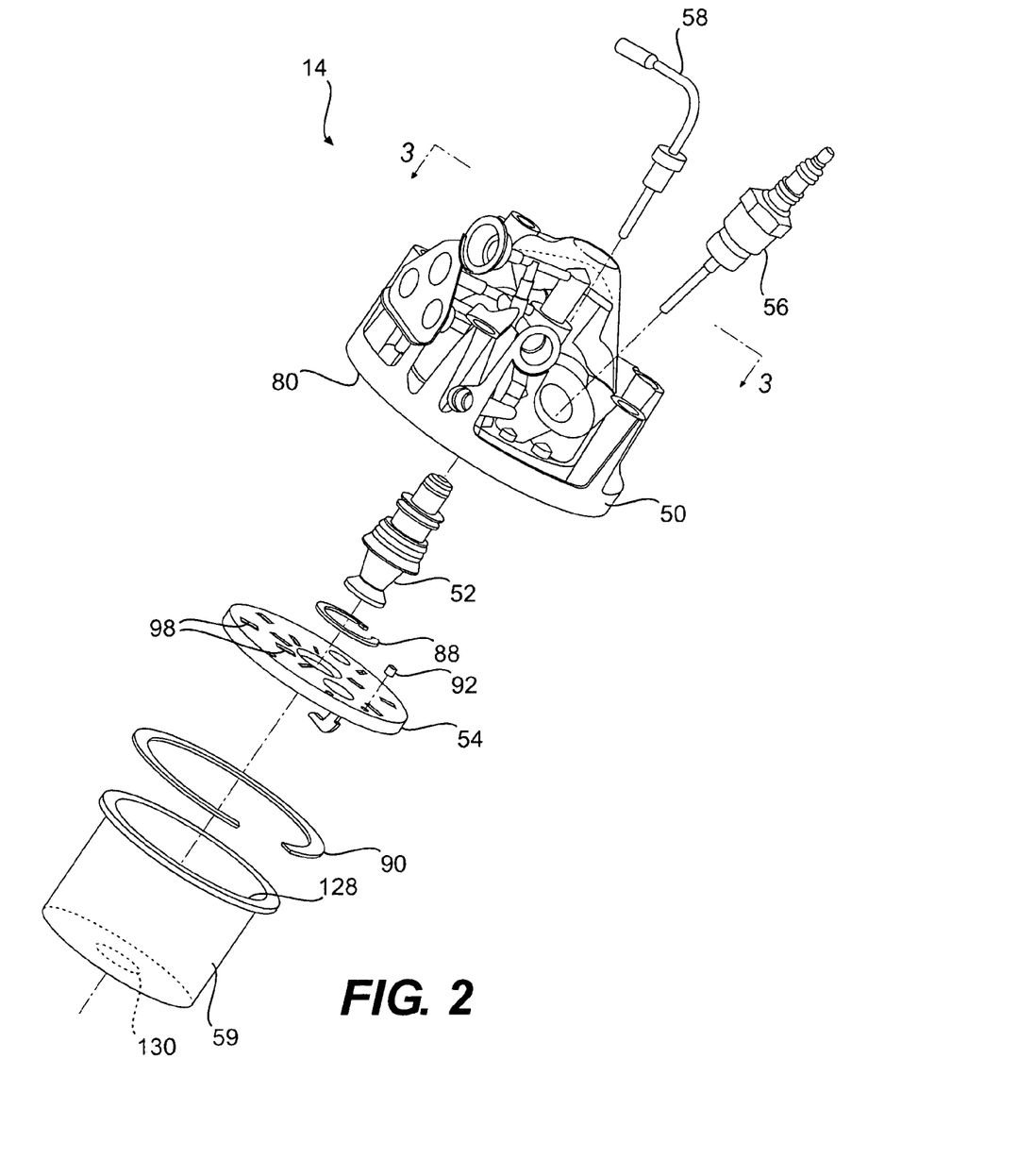
FIG. 2 is an exploded view illustration an exemplary disclosed treatment device for use with the power unit of FIG. 1.

As illustrated in FIG. 2, auxiliary regeneration system 14 may include components that cooperate to periodically reduce the buildup of particulate matter within filtration media 48. These components may include, among other things, a mounting member 50, an injector 52, a mixer 54, a spark plug 56, a thermal couple 58, and a combustion canister 59. It is contemplated that auxiliary regeneration system 14 may include additional and/or different components such as, for example, one or more pilot injectors, additional main injectors, a controller, a pressure sensor, a flow sensor, a flow blocking device, and other components known in the art.

Figure 3:
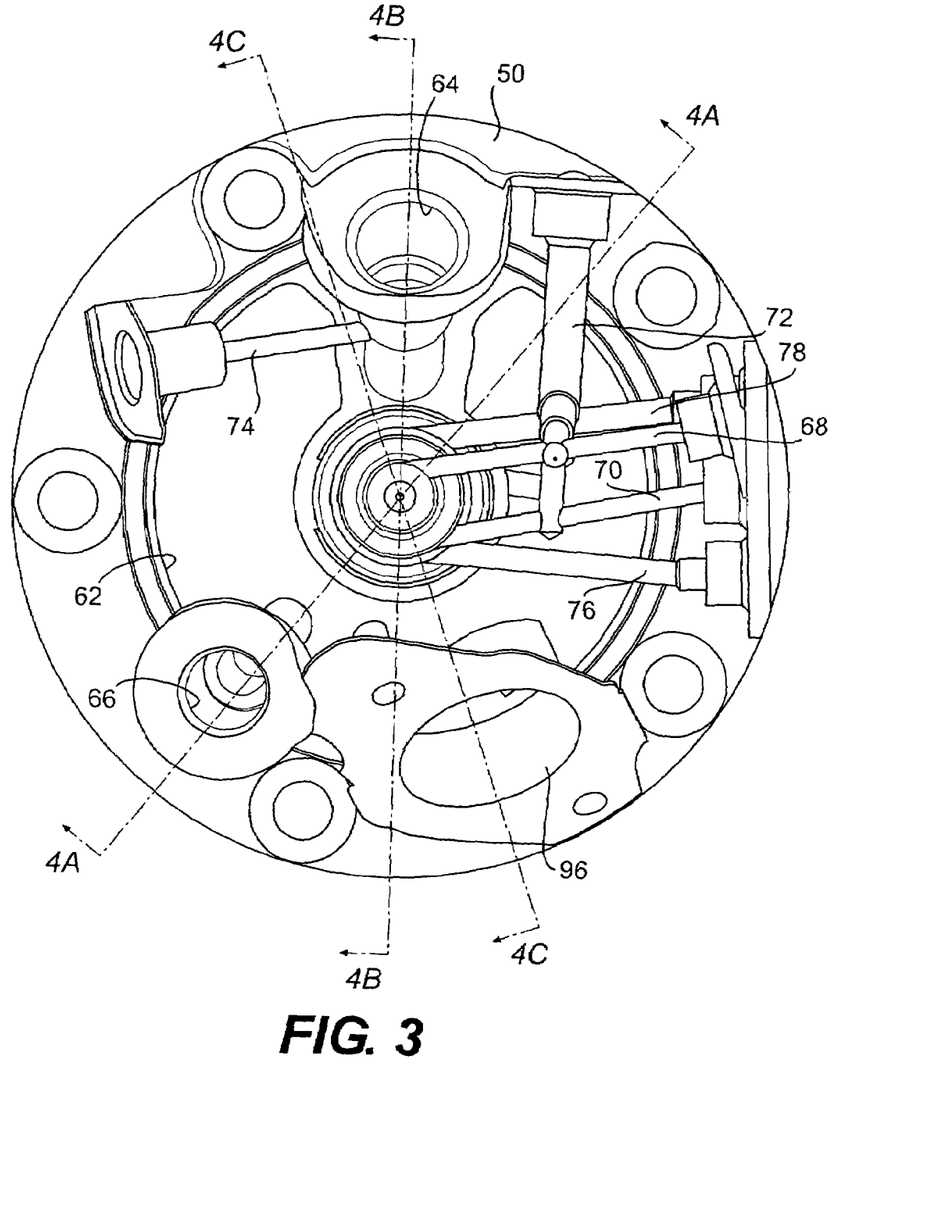
FIG. 3 is a top view pictorial illustration of the exhaust treatment device of FIG. 2.

Mounting member 50 may receive and fluidly connect fuel injector 52, mixer 54, spark plug 56, and thermal couple 58. In particular, as illustrated in FIG. 3, mounting member 50 may have a central stepped bore 60, a central recessed opening 62, a first radially located bore 64, and a second radially located bore 66. Mounting member 50 may also include a pilot fuel passage 68, a main fuel passage 70, a branching purge passage 72, a separate purge passage 74, and inlet and outlet cooling passages 76 and 78. One or more check valves (not shown) may be situated in any one or all of these passageways, if desired, to ensure unidirectional flow of the respective fluids and/or to minimize the volumes thereof that could require periodic purging.

Figures 4A, 4B:
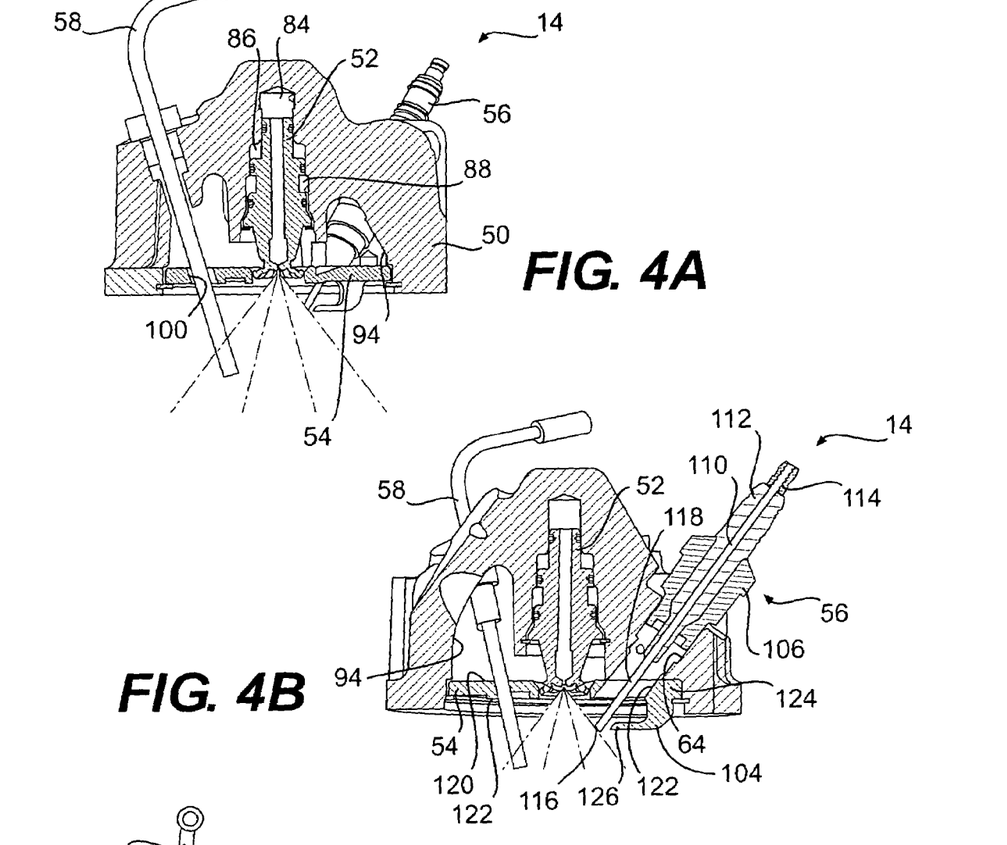
FIG. 4A is a cross-sectional illustration of the exhaust treatment device of FIG. 2.
FIG. 4B is another cross-sectional illustration of the exhaust treatment device of FIG. 2.

Central stepped bore 60 may receive fuel injector 52 through an inner surface 80 (referring to the surface of mounting member 50 illustrated in FIG. 2 as being open to exhaust treatment device 46). As illustrated in FIG. 4A, central stepped bore 60, together with fuel injector 52, may form a pilot fuel chamber 82, a main fuel chamber 84, and a coolant chamber 86 within the steps of bore 60. Pilot fuel chamber 82 may be fluidly communicated with pilot fuel passage 68 (referring to FIG. 3), while main fuel chamber 84 may be fluidly communicated with main fuel passage 70. Coolant chamber 86 may be fluidly communicated with both the inlet and outlet cooling passages 76, 78. A snap ring 88 (referring to FIG. 2) may retain fuel injector 52 within central stepped bore 60.

Central recessed opening 62 may receive mixer 54 also through the inner surface 80. Mixer 54 may be press-fitted completely within central recessed opening 62 and/or held in place with a snap ring 90 (referring to FIG. 2). Mixer 54 may be centrally aligned with fuel injector 52 and mounting member 50, and angularly oriented with respect to mounting member 50 by way of one or more dowel pins 92.

First radially located bore 64 may receive spark plug 56 through an external surface of mounting member 50. In particular, spark plug 56 may include external threads that engage internal threads of first radially located bore 64. First radially located bore 64 may be in communication with separate purge passage 74 such that carbon and other contaminates may be periodically purged from bore 64 and, thereby, prevented from building on spark plug 56 and causing unintentional arcing.

Second radially located bore 66 may receive thermal couple 58 through the external surface of mounting member 50. Similar to spark plug 56, thermal couple 58 may also have external threads that engage internal threads of second radially located bore 66. Although no passages are illustrated as communicating fluids with thermal couple 58, it is contemplated that purge fluid from purge system 13 may alternatively be directed to second radially located bore 66 to minimize the buildup of contaminates therein, if desired.

Injector 52 may be disposed within mounting member 50 and operable to inject an amount of pressurized fuel into combustion canister 59 at predetermined timings, fuel pressures, and fuel flow rates. The timing of fuel injection into canister 59 may be synchronized with sensory input received from thermal couple 58, one or more pressure sensors (not shown), a timer (not shown), or any other similar sensory devices such that the injections of fuel substantially correspond with a buildup of particulate matter within filtration media 48. For example, fuel may be injected as the temperature of the exhaust flowing through exhaust treatment device 46 exceeds a predetermined value. Alternatively or additionally, fuel may be injected as a pressure of the exhaust flowing through exhaust treatment device 46 exceeds a predetermined pressure level or a pressure drop across filtration media 48 exceeds a predetermined differential value. It is contemplated that fuel may also be injected on a set periodic basis, in addition to or regardless of pressure and temperature conditions, if desired.

Figure 4C:
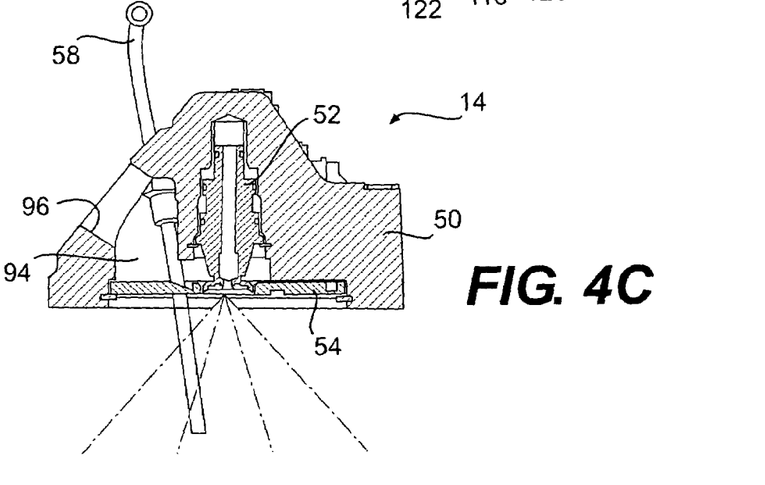
FIG. 4C is another cross-sectional illustration of the exhaust treatment device of FIG. 2.

Mixer 54, together with mounting member 50, may form an air distribution passage 94, which may be supplied with compressed air from purge system 13 via an inlet 96 (referring to FIG. 4C). Mixer 54 may include a plurality of annularly disposed air vents 98 fluidly communicating air distribution passage 94 with combustion canister 59 (referring to FIG. 2). Air vents 98 may mix air from purge system 13 with injections of fuel inside combustion canister 59 to improve combustion therein. It is contemplated that air vents 98 may additionally or alternatively be configured to direct pressurized air to the outer periphery of combustion canister 59 for cooling and/or insulating purposes, if desired.

Mixer 54 may include openings to accommodate thermal couple 58 and spark plug 56. Specifically, thermal couple 58 may extend into combustion canister 59 via a first through hole 100 in mixer 54, while spark plug 56 may extend into combustion canister 59 via a second through hole 102. A grounded electrode 104 may extend from mixer 54 proximal second through hole 102 to interact with spark plug 56.

Spark plug 56 may facilitate ignition of fuel sprayed from injector 52 into combustion canister 59. Specifically, during a regeneration event or when a catalyst within exhaust treatment device 46 requires an elevated temperature, the temperature of the exhaust exiting power unit 10 may be too low to cause auto-ignition of the fuel sprayed from injector 52. To initiate combustion of the fuel and, subsequently, the trapped particulate matter, a small quantity (i.e., a pilot shot) of fuel from injector 52 may be sprayed or otherwise injected toward spark plug 56 to create a locally rich atmosphere readily ignitable by spark plug 56. A spark developed across electrodes of spark plug 56 may ignite the locally rich atmosphere creating a flame, which may be jetted or otherwise advanced toward the trapped particulate matter. The flame jet propagating from injector 52 may raise the temperature within exhaust treatment device 46 to a level that readily supports efficient ignition of a larger quantity (i.e., a main shot) of fuel from injector 52. As the main injection of fuel ignites, the temperature within exhaust treatment device 46 may continue to rise to a level that causes ignition of the particulate matter trapped within filtration media 48 and/or to a level that supports efficient operation of the catalyst.

Spark plug 56 may include multiple components that cooperate to ignite the fuel sprayed from injector 52. In particular, spark plug 56 (referring to FIG. 4B) may include a body 106, a terminal 108 extending from one end of body 106, and a center electrode 110 extending from an opposing second end of body 106. Body 106 may be threadingly received within stepped bore 64, and separated from center electrode 110 by an insulating element 112. Terminal 108 may be electrically connected to center electrode 110, integral with center electrode 110, or completely omitted, if desired.

An electrical arc may be generated between center electrode 110 and grounded electrode 104. That is, center electrode 110 may have a base end 114 operatively fixed to body 106, a free tip end 116, and a side portion 118 extending from base end 114 to free tip end 116. When spark plug 56 is assembled into mounting member 50, the free tip end 116 may extend from a first surface 120 of mixer 54 through hole 102 past a second opposing surface 122 of mixer 54. Grounded electrode 104 may have a base end 124 connected to the second surface 122 of mixer 54 (i.e., integrally formed with mixer 54), and a free tip end 126. The free tip end 126 of grounded electrode 104 may extend toward the side portion 118 of center electrode 110, and terminate at a radial position between the base end 124 and the side portion 118. The distance between the free tip end 126 and the free tip end 116 may be designed such that, when a charge is directed through terminal 108 to center electrode 110, an arc may form from the free tip end 116 to the free tip end 126 of grounded electrode 104. This arc may facilitate ignition of the fuel/air mixture within combustion canister 59.

Thermal couple 58 may confirm successful ignition of the fuel/air mixture within combustion chamber 59. A thermal couple generally consists of a bi-metal rod inside of a stainless steel shell. When the rod heats up, a direct current is generated that can be measured, and the value of the measured current may be indicative of the temperature in contact with the rod. Thermal couple 58 may extend through mixer 54 into the ignited flame jet within combustion canister 59 for indicating the temperature therein. When a temperature measured within combustion canister 59 exceeds a predetermined value, it can be concluded that ignition of the air-fuel mixture has been achieved. Similarly, when the temperature measured within combustion canister 59 drops below the predetermined value, it can be concluded that flame jet has been extinguished. It is contemplated that the injections of fuel and/or the flow rate or pressure of air directed into combustion canister 59 may be varied in response to the value of the current generated by thermal couple 58.

Combustion canister 59 (referring to FIG. 2) may embody a tubular member configured to axially direct an ignited fuel/air mixture (i.e., the flame jet) from auxiliary regeneration device 14 into the exhaust flow of treatment device 46. In particular, combustion canister 59 may include a central opening 128 that fluidly communicates fuel from fuel injector 52 and air from distribution passage 94 with the exhaust flow. Combustion canister 59 may employ a flame stabilizing plate 130 at one end of central opening 128 to provide a restriction that minimizes pulsations within exhaust treatment device 46. That is, the inner diameter of flame stabilizing plate 130 may be less than the inner diameter of central opening 128. Combustion canister 59 may be generally straight and have a predetermined length set during manufacture according to a desired flame introduction location (the distance that a flame resulting from the ignition of the fuel/air mixture extends from combustion canister 59 into the exhaust flow). In one example, this desired introduction location may be about 12 inches from flame stabilizing plate 130 of combustion canister 59.

INDUSTRIAL APPLICABILITY

The fuel powered burner of the present disclosure may be applicable to a variety of exhaust treatment devices including, for example, particulate traps requiring periodic regeneration, catalytic converters requiring a predetermined temperature for optimal operation, and other similar devices known in the art. In fact, the disclosed fuel burner may be implemented into any engine system that benefits from selectively elevated temperatures. The operation of power unit 10 will now be explained.

Referring to FIG. 1, air and fuel may be drawn into the combustion chambers of power unit 10 for subsequent combustion. Specifically, fuel from common rail fuel system 12 may be injected into the combustion chambers of power unit 10, mixed with the air therein, and combusted by power unit 10 to produce a mechanical work output and an exhaust flow of hot gases. The exhaust flow may contain a complex mixture of air pollutants composed of gaseous and solid material, which can include particulate matter. As this particulate laden exhaust flow is directed from the combustion chambers through exhaust treatment device 46, particulate matter may be strained from the exhaust flow by filtration media 48. Over time, the particulate matter may build up in filtration media 48 and, if left unchecked, the buildup could be significant enough to restrict, or even block the flow of exhaust through exhaust treatment device 46. As indicated above, the restriction of exhaust flow from power unit 10 may increase the backpressure of power unit 10 and reduce the unit's ability to draw in fresh air, resulting in decreased performance of power unit 10, increased exhaust temperatures, and poor fuel consumption.

To prevent the undesired buildup of particulate matter within exhaust treatment device 46, filtration media 48 may be regenerated. Regeneration may be periodic or based on a triggering condition such as, for example, a lapsed time of engine operation, a pressure differential measured across filtration media 48, a temperature of the exhaust flowing from power unit 10, or any other condition known in the art.

As illustrated in FIG. 2, to initiate regeneration, injector 52 may be caused to selectively pass fuel into exhaust treatment device 46 at a desired rate, pressure, and/or timing. As an injection of fuel from injector 52 sprays into exhaust treatment device 46, air may be mixed with the fuel via the air vents 98 of mixer 54. As this fuel/air mixture swirls into combustion canister 59, a current may be directed to center electrode 110 via terminal 108. As the current builds within center electrode 110, an arc may form from free tip end 116 of center electrode 110 to free tip end 126 of grounded electrode 104, thereby igniting the mixture. The ignited flow of fuel and air may then raise the temperature of the particulate matter trapped within filtration media 48 to the combustion level of the entrapped particulate matter, burning away the particulate matter and, thereby, regenerating filtration media 48. A similar process may be followed to raise the temperature of a suitable catalyst, if desired.

Between and/or during heating events, fuel injector 52 and/or spark plug 56 may be selectively purged of fuel and/or contaminates to ensure proper operation. To purge fuel injector 52 and spark plug 56, purge fluid from source 44 may be directed through purge passageway 40, past check valve 42, and through stepped bores 60, 64. The purge fluid flowing into stepped bores 60, 64 may force any remaining fuel and contaminates within these bores out into combustion canister 59. By removing the fuel and/or contaminates from stepped bores 60, 64, the likelihood of clogging fuel injector 52 or of arcing at a point other than the free tip end 116 of center electrode 110 may be ensured.

Space within the engine compartment of power unit 10 may be preserved because of the configuration of auxiliary regeneration device 14. That is, because mixer 54 is contained completely within mounting member 50, very little, if any, usable space is consumed by mixer 54. Increased space within the engine compartment of power unit 10 may improve the design flexibility of other components associated with power unit 10.

In addition, because auxiliary regeneration device 14 employs a thermal couple, the operation of exhaust treatment device 46 may be optimally efficient. In particular, if, based on the temperature indication from thermal couple 58, it is determined that no flame exists within combustion canister 59 and fuel has been injected into combustion canister 59, a fault condition may be initiated. During the fault condition, further injections of fuel may be prevented to minimize wasted fuel. It is contemplated that the temperature indication from thermal couple 58 may also be used as in input to control the fueling rate and/or air supply rate of auxiliary regeneration device 14, if desired.

It will be apparent to those skilled in the art that various modifications and variations can be made to the fuel powered burner of the present disclosure without departing from the scope of the disclosure. Other embodiments will be apparent to those skilled in the art from consideration of the specification and practice of the fuel powered burner disclosed herein. It is intended that the specification and examples be considered as exemplary only, with a true scope of the disclosure being indicated by the following claims and their equivalents.

What is claimed is:

1. An aftertreatment burner, comprising:
   a mounting member having a bore;
   a canister connected to the mounting member to form a combustion chamber;
   a fuel injector disposed within the bore of the mounting member to selectively inject fuel into the combustion chamber, the fuel injector together with the mounting member forming a coolant chamber surrounding at least a portion of the fuel injector;

an air supply line formed within the mounting member and configured to supply air to the combustion chamber;

an igniter disposed within the mounting member and configured to ignite the fuel/air mixture; and a coolant line formed within the mounting member and in fluid communication with the coolant chamber.

2. The aftertreatment burner of claim 1, further including a mixer completely disposed within a cavity of the mounting member and configured to mix the supplied air into the injected fuel as the fuel is injected.

3. The aftertreatment burner of claim 2, wherein the mixer is located at an outlet of the fuel injector.

4. The aftertreatment burner of claim 2, wherein the mixer, together with the mounting member, substantially encloses the fuel injector.

5. The aftertreatment device of claim 2, further including an air distribution passage formed within the mounting member around the fuel injector and in fluid communication with the air supply line, the mixer forming a wall of the air distribution passage.

6. The aftertreatment burner of claim 1, further including a purge line formed within the mounting member and in selective fluid communication with a supply of purge fluid and the fuel injector.

7. The aftertreatment burner of claim 6, further including a second purge line formed within the mounting member and in selective fluid communication with the igniter.

8. The aftertreatment burner of claim 1, further including a thermal couple extending through an air/fuel mixer into the combustion chamber, the thermal couple configured to detect the ignition.

9. The aftertreatment burner of claim 1, further including a snap ring retaining the fuel injector within a bore of the mounting member from an exhaust side of the mounting member.

10. The aftertreatment burner of claim 1, further including:
a main fuel passage formed within the mounting member and in fluid communication with the fuel injector; and
a pilot fuel passage formed within the mounting member and in fluid communication with the fuel injector.

11. The aftertreatment burner of claim 1, wherein the mounting member is a single integral component.

12. An aftertreatment burner, comprising:
a mounting member;
a canister connected to the mounting member to form a combustion chamber;
a fuel injector disposed within the mounting member to selectively inject fuel into combustion chamber;
an air supply line formed within the mounting member and configured to supply air to the combustion chamber;
an igniter disposed within the mounting member to ignite a fuel/air mixture;
a mixer disposed within the mounting member to mix the supplied air into the fuel as the fuel is injected into the combustion chamber; and
an air distribution passage formed within the mounting member and annularly formed about the fuel injector, the air distribution passage provided with air from the air supply line and annularly open to the mixer.

13. The aftertreatment burner of claim 12, further including:
a first purge line formed within the mounting member and in selective fluid communication with the fuel injector; and a second purge line formed within the mounting member and in selective fluid communication with the spark plug.

14. The aftertreatment burner of claim 12, further including a coolant line formed within the mounting member and in fluid communication with the fuel injector.

15. The aftertreatment burner of claim 12, further including:
a main fuel chamber formed by the mounting member and the fuel injector; and
a pilot fuel chamber formed by the mounting member and the fuel injector, the pilot fuel chamber axially separated from the main fuel chamber.

16. The aftertreatment burner of claim 12, wherein the mounting member is a single integral component.

17. A power system, comprising:
a combustion engine configured to produce a power output and a flow of exhaust;
an aftertreatment device configured to treat the flow of exhaust; and
an aftertreatment burner configured to raise the temperature of the aftertreatment device, the aftertreatment burner including:
a mounting member;
a canister connected to the mounting member to form a combustion chamber;
a fuel injector disposed within the mounting member to selectively inject fuel into combustion chamber;
an air supply line formed within the mounting member and configured to supply air to the combustion chamber;
an air distribution passage formed within the mounting member, annularly formed about the fuel injector and being in fluid communication with the air supply line;
an igniter disposed within the mounting member to ignite a fuel/air mixture;
a thermal couple disposed within the mounting member and configured to detect the ignition; and
a mixer disposed within the mounting member and forming a wall of the air distribution passage to mix the supplied air into the injected fuel as the fuel is injected.

18. The power system of claim 17, further including:
a coolant line formed within the mounting member and in fluid communication with the fuel injector;
a main fuel passage formed within the mounting member and in fluid communication with the fuel injector;
a pilot fuel passage formed within the mounting member and in fluid communication with the fuel injector;
a first purge line formed within the mounting member and in selective fluid communication with the main fuel passage and the pilot fuel passage; and
a second purge line formed within the mounting member and in selective fluid communication with the igniter.

19. The power system of claim 17, wherein the mounting member is a single integral component.

20. The power system of claim 17, wherein a flow path from the engine through the aftertreatment device is generally straight, and the aftertreatment burner is located within a side wall of the aftertreatment device at an oblique angle to the flow of exhaust through the aftertreatment device.

* * * * *